(12) United States Patent
Williams

(10) Patent No.: US 7,080,135 B1
(45) Date of Patent: *Jul. 18, 2006

(54) SYSTEMS AND METHODS FOR ACCESSING AN ADDRESS TABLE OF A NETWORK DEVICE

(75) Inventor: Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 09/767,884

(22) Filed: Jan. 24, 2001

(51) Int. Cl.
*G06F 15/173* (2006.01)

(52) U.S. Cl. .................. 709/223; 709/217; 709/245

(58) Field of Classification Search .............. 709/223, 709/225, 200, 245, 238, 220, 217; 395/325, 395/200.48; 714/758; 370/238, 241, 392; 711/209

See application file for complete search history.

(56) References Cited

U.S. PATENT DOCUMENTS

| | | | |
|---|---|---|---|
| 3,972,025 A | 7/1976 | Taddei | 340/172.5 |
| 5,247,620 A * | 9/1993 | Fukuzawa et al. | 709/245 |
| 5,592,625 A | 1/1997 | Sandberg | 395/200.08 |
| 5,892,912 A | 4/1999 | Suzuki et al. | 395/200.48 |
| 5,960,169 A * | 9/1999 | Styczinski | 714/6 |
| 5,978,951 A * | 11/1999 | Lawler et al. | 714/758 |
| 6,108,308 A * | 8/2000 | Flavin et al. | 370/238 |
| 6,111,874 A | 8/2000 | Kerstein | 370/389 |
| 6,205,465 B1 * | 3/2001 | Schoening et al. | 718/102 |
| 6,470,436 B1 * | 10/2002 | Croft et al. | 711/206 |
| 6,505,228 B1 * | 1/2003 | Schoening et al. | 718/106 |
| 6,604,136 B1 | 8/2003 | Chang et al. | 709/223 |
| 6,654,347 B1 | 11/2003 | Wiedeman et al. | 370/241 |
| 6,681,258 B1 | 1/2004 | Ratcliff et al. | 709/245 |
| 2003/0172147 A1 * | 9/2003 | Chang et al. | 709/223 |

OTHER PUBLICATIONS

U.S. Appl. No. 09/814,818, filed Mar. 23, 2001.

* cited by examiner

*Primary Examiner*—Frantz B. Jean
(74) *Attorney, Agent, or Firm*—Harrity Snyder, LLP

(57) ABSTRACT

A network device is connected to a host and performs table accesses on behalf of the host. The network device includes an address table, a register, and table access logic. The address table stores entries. The register is accessible by the host and is configured to store data for an entry in the address table. The table access logic receives a command from the host to insert a new entry in the address table, delete an existing entry from the address table, or search for an entry in the address table. When the command is to insert an entry, the table access logic identifies a location in the address table to store the new entry and stores the data from the register in the address table at the identified location. When the command is to delete an existing entry, the table access logic applies a hashing function to the data in the register, searches the address table to locate one of the entries to delete using the hashed data, and deletes the located entry from the address table. When the command is to search the address table, the table access logic locates one of the entries in the address table using the data from the register and stores the contents of the located entry in the register.

20 Claims, 8 Drawing Sheets

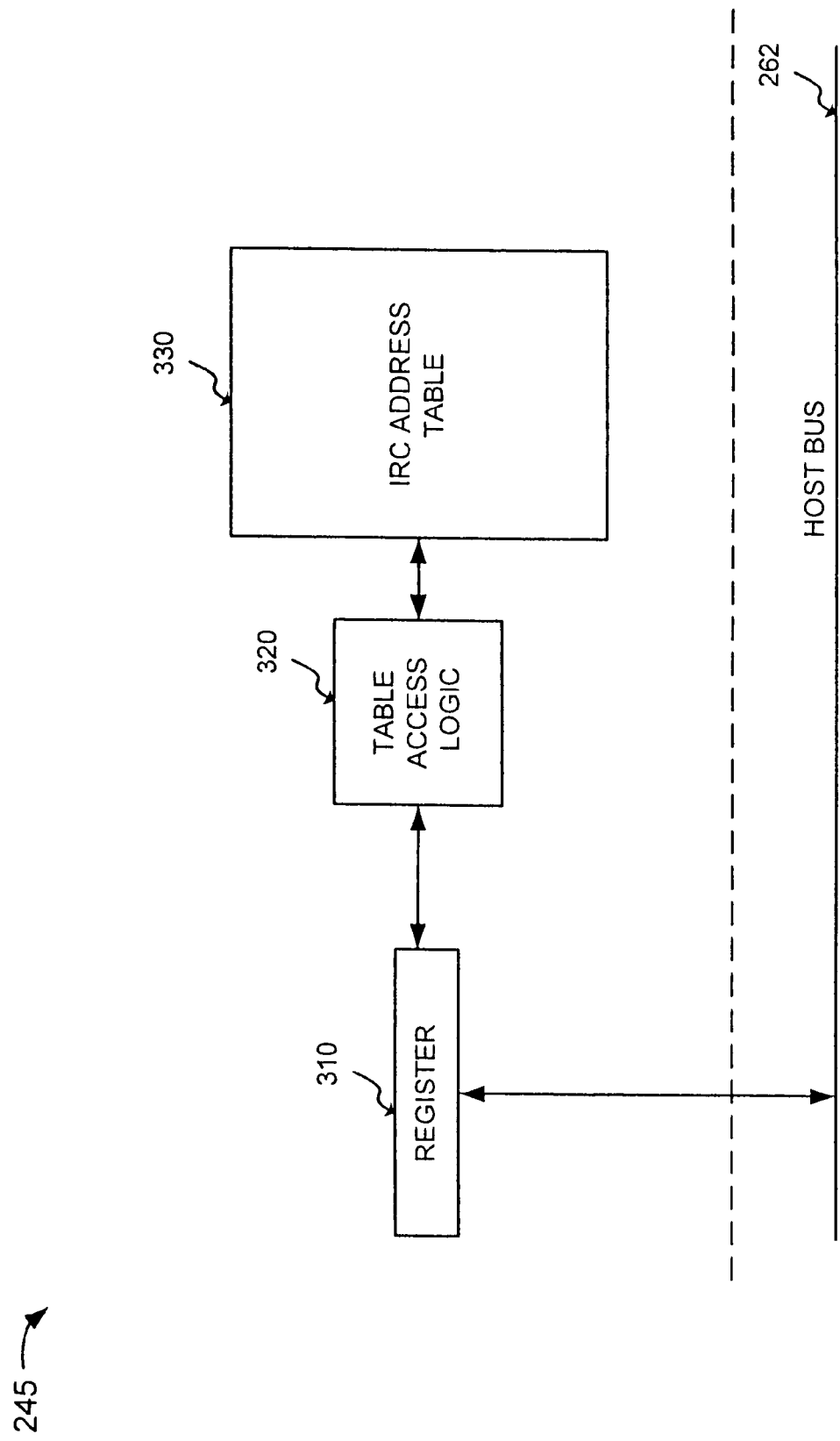

SYSTEMS AND METHODS FOR ACCESSING AN ADDRESS TABLE OF A NETWORK DEVICE

RELATED APPLICATION

This application is related to copending U.S. application Ser. No. 09/767,884, entitled "SYSTEMS AND METHODS FOR ACCESSING AN ADDRESS TABLE OF A NETWORK DEVICE," and filed on Jan. 24, 2001, by the assignee of the present application.

TECHNICAL FIELD

The present invention relates generally to communication systems and, more particularly, to systems and methods for accessing an address table of a network device.

BACKGROUND ART

Conventional network switches typically include an address table that aids the switch in making forwarding decisions regarding a received packet. Sometimes the address table can be modified both by hardware within the switch and by a management device external to the switch. During the course of normal operation, the switch hardware creates new entries to the table as it learns new source address information. The switch hardware also deletes entries when certain end nodes have not transmitted any data for a predetermined amount of time.

The management device also creates and deletes table entries, as well as periodically searches the table. In a typical table access, the management device generates a hash key, locks the table, and accesses the table using the hash key. The management device then unlocks the table.

Problems arise as a result of the management device accesses to the table. For example, each of the management device accesses typically uses scarce bus bandwidth. Also, while the management device modifies the table, the management device must lock relevant portions of the table so that the switch hardware does not access invalid data while the data within the table is being changed.

DISCLOSURE OF THE INVENTION

There exists a need for mechanisms to perform accesses to an address table of a network device that minimize accesses to the table by a management device. This and other needs are met by the present invention, where local hardware, under software control when needed, performs searches of and modifications to the address table on behalf of the management device.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that is connected to a host and performs table accesses on behalf of the host. The network device includes an address table, a register, and table access logic. The address table stores entries. The register is accessible by the host and is configured to store data for an entry in the address table. The table access logic receives a command from the host to insert a new entry in the address table, delete an existing entry from the address table, or search for an entry in the address table. When the command is to insert an entry, the table access logic identifies a location in the address table to store the new entry and stores the data from the register in the address table at the identified location. When the command is to delete an existing entry, the table access logic applies a hashing function to the data in the register, searches the address table to locate one of the entries to delete using the hashed data, and deletes the located entry from the address table. When the command is to search the address table, the table access logic locates one of the entries in the address table using the data from the register and stores the contents of the located entry in the register.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
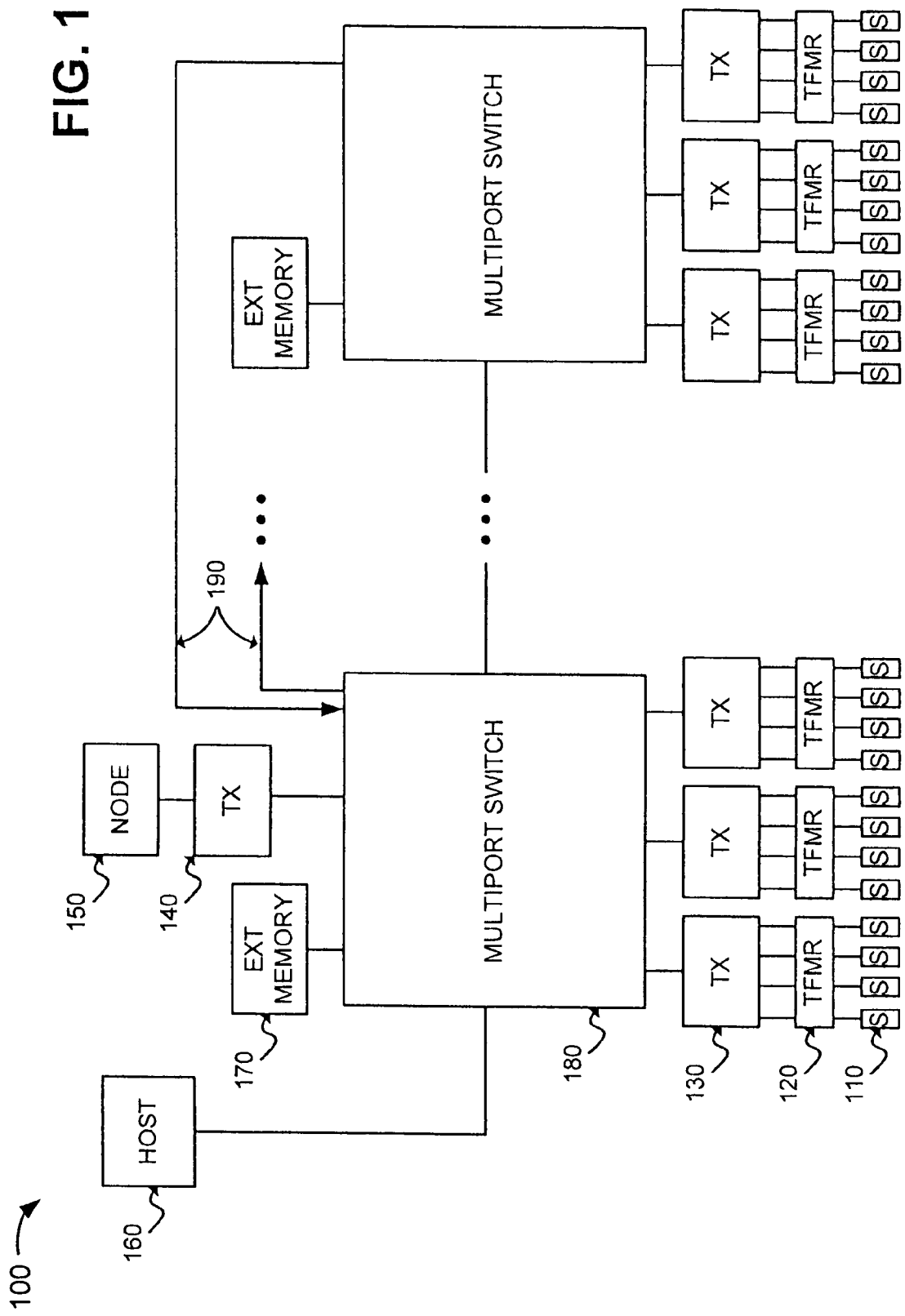
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 10 may include conventional communication devices, such as computers, with different configurations. For example, the devices may send and receive data at network data rates of 10 megabits per second (Mb/s) or 100 Mb/s.

Each 10/100 Mb/s network station 10 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 10 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 10 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 10 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 10 via the SMII/RMII. The SMII/RMII may operate at a data rate sufficient to enable simultaneous transmission and reception of data packets by each of the network stations 10 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
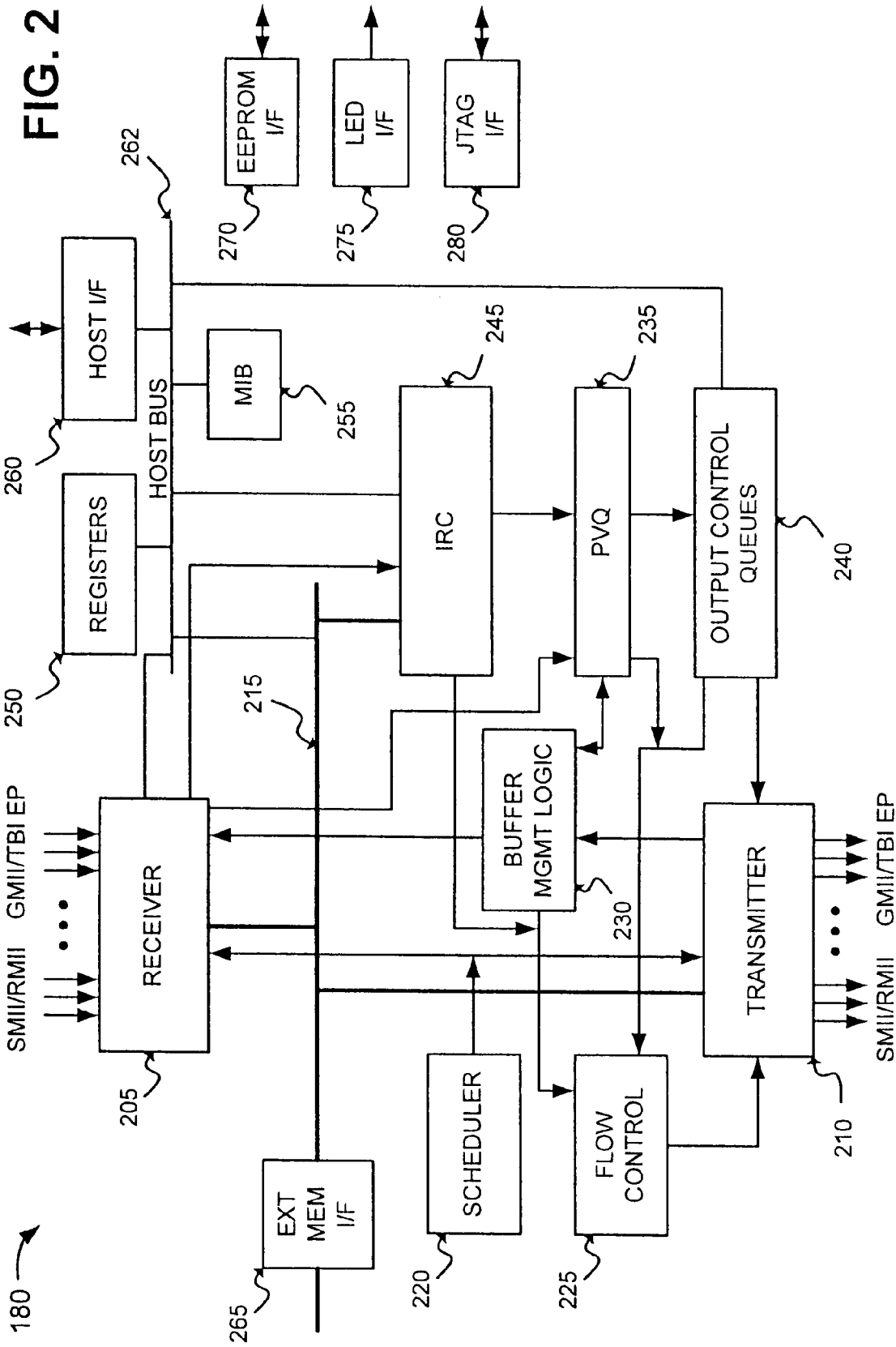
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler. 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table. The IRC address table is described in more detail below with regard to FIG. 4.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Internal Rules Checker

The present invention is directed to the IRC 245 and, more particularly, to logic within the IRC 245 that operates under control of a management device, such as the host 160, to access the address table of the IRC 245 in a manner that efficiently uses the scarce bandwidth on the host bus 262 and increases the operating speed of the multiport switch 180.

Figure 3:
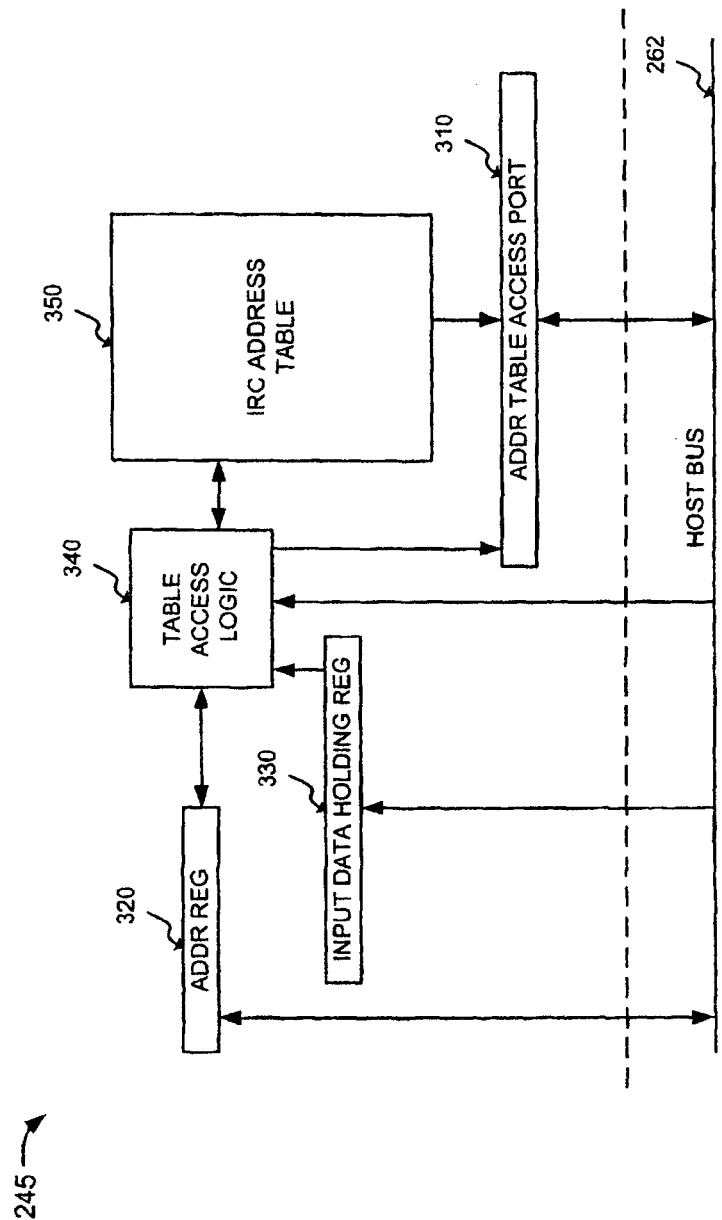
FIG. 3 is an exemplary diagram of a portion of the internal rules checker of FIG. 2 according to an implementation consistent with the present invention.
Figure 4:
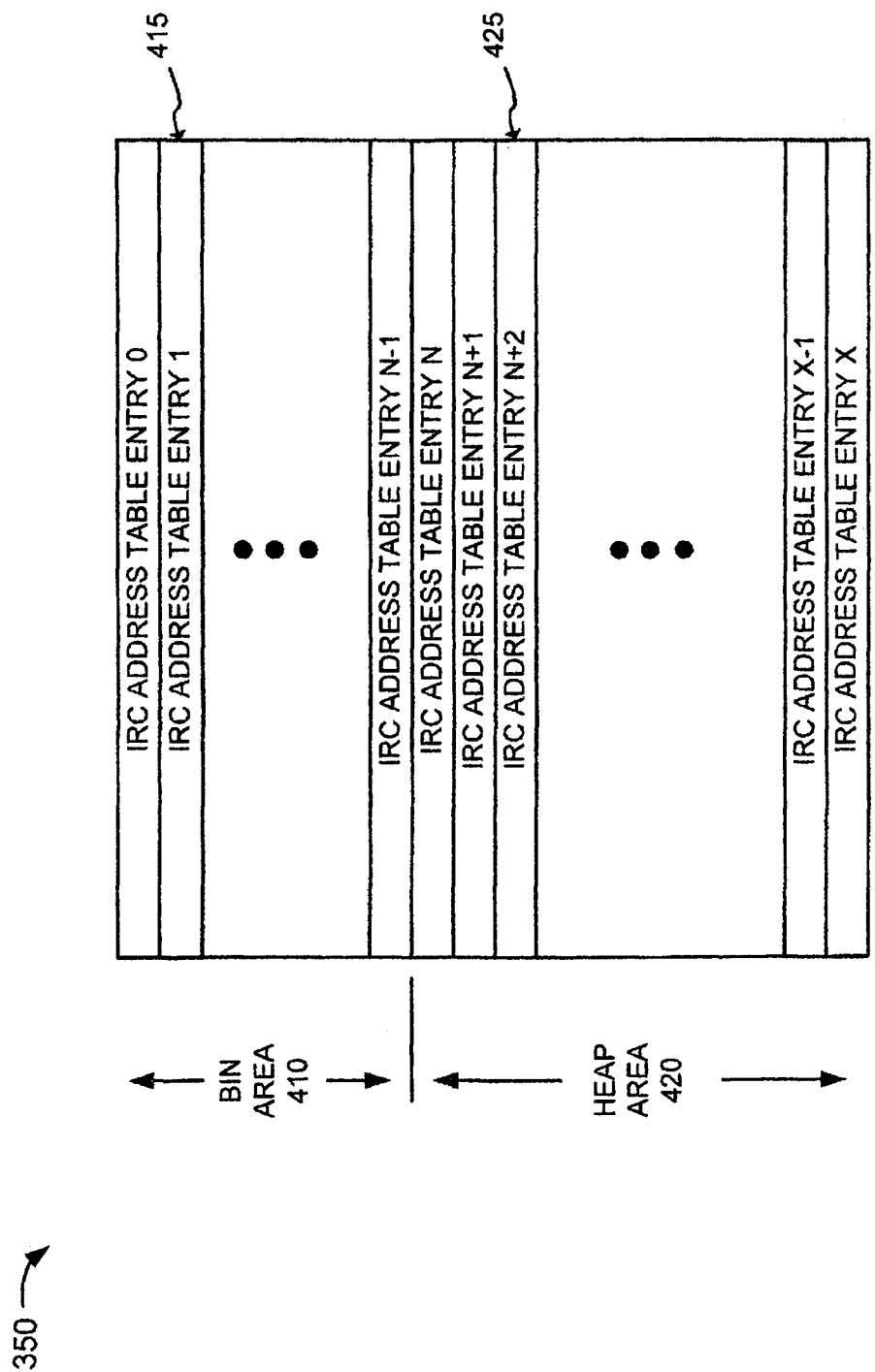
Figure 5:
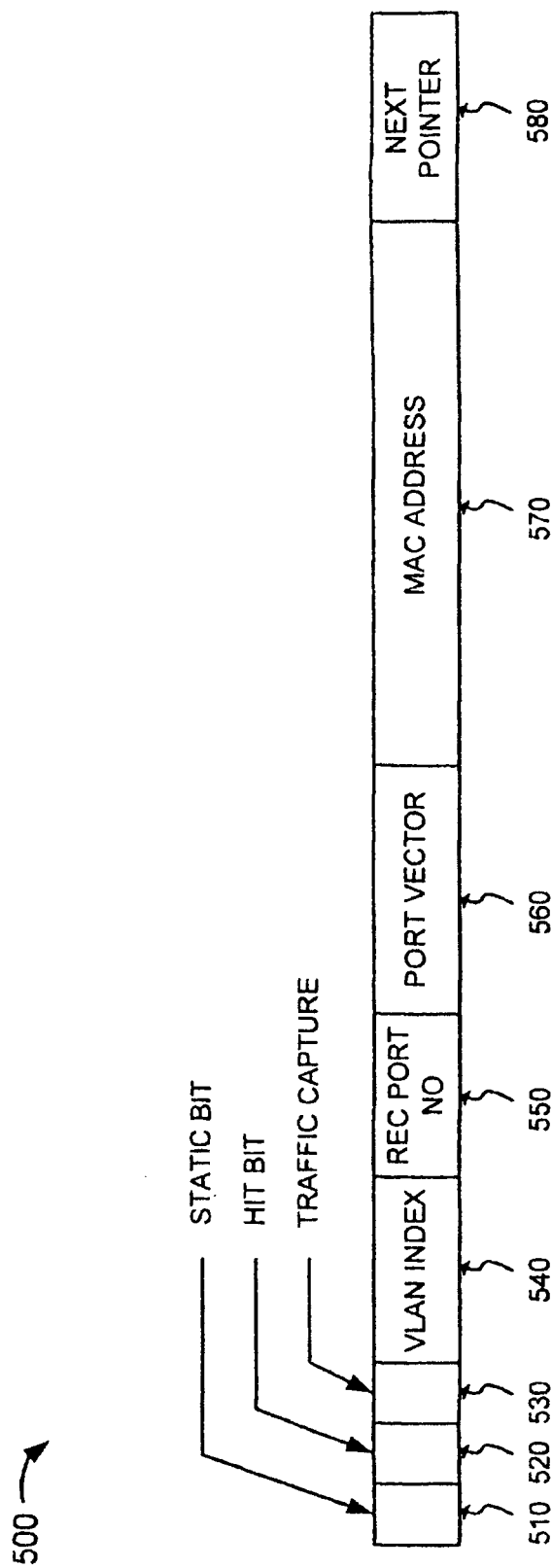
Figure 6:
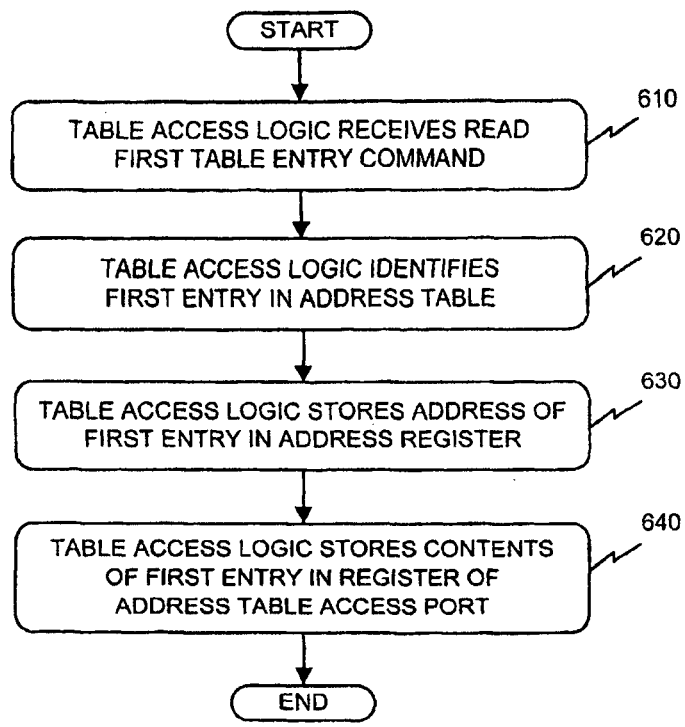
Figure 7:
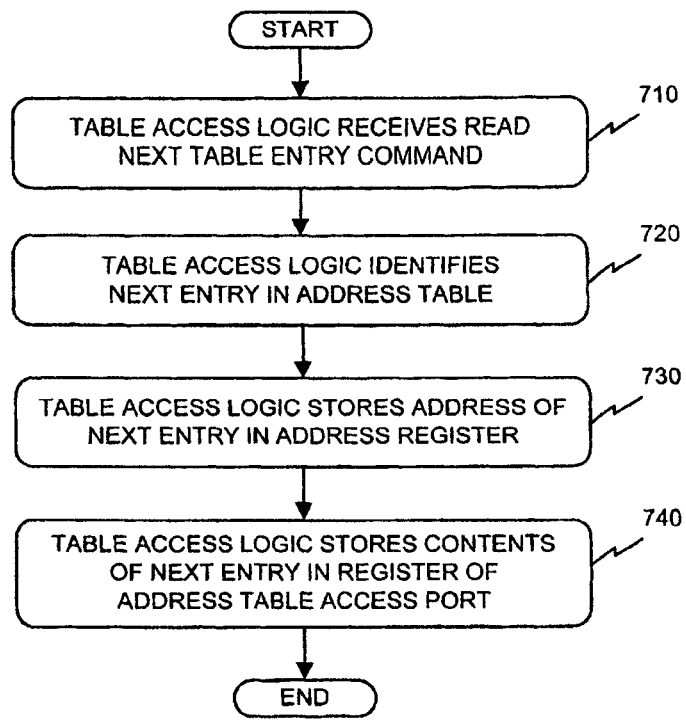
Figure 8:
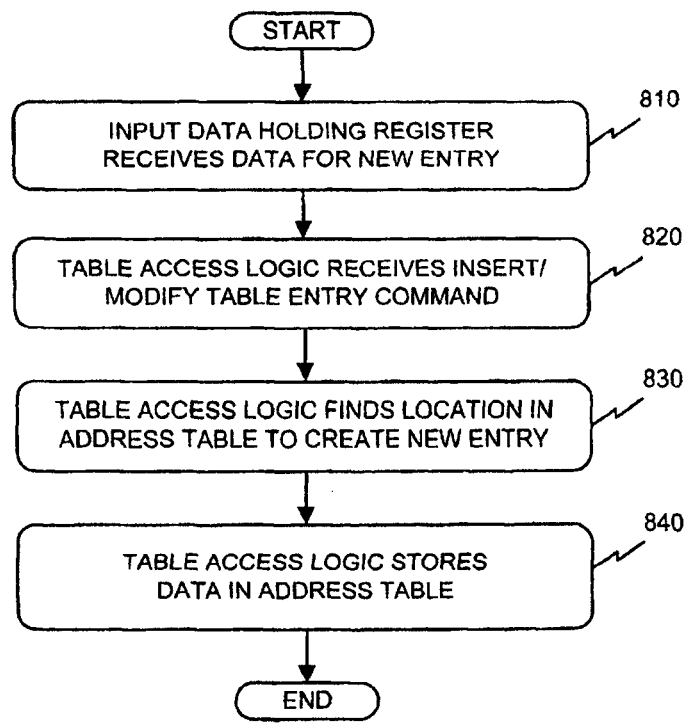

FIG. 3 is an exemplary diagram of a portion of the IRC 245 in accordance with an implementation consistent with the present invention. The IRC 245 may include a register 310, table access logic 320, and an IRC address table 330. The register 310 may include a memory device that stores a command from the host 160, an address of an entry in the address table 330, and/or data for a table entry to be created or an existing table entry to be deleted. The command may include instructions for accessing the address table 330, such as inserting or modifying an entry in the address table 330, deleting an entry from the address table 330, or searching for a MAC address in the address table 330. The register 310 may also store data indicating whether the command has been executed by the IRC 245. The table access logic 320 may include one or more hardware components, such as a controller and/or a number of logic gates, capable of executing the commands for accessing the address table 330.

The address table 330 may support user addresses and capabilities for unique VLANs. The number of addresses and VLANs supported may differ depending on the desired table size. VLANs provide broadcast domains, where the broadcast traffic is kept inside of the VLAN. For example, a specific VLAN may contain a group of users at a high level of an organization. When sending data to this group of users, the data may include a specific VLAN identifier (ID) associated with this particular group to ensure that only these users receive the data. These VLAN groupings can be considered "sub-networks" within a larger network.

Figure 4:
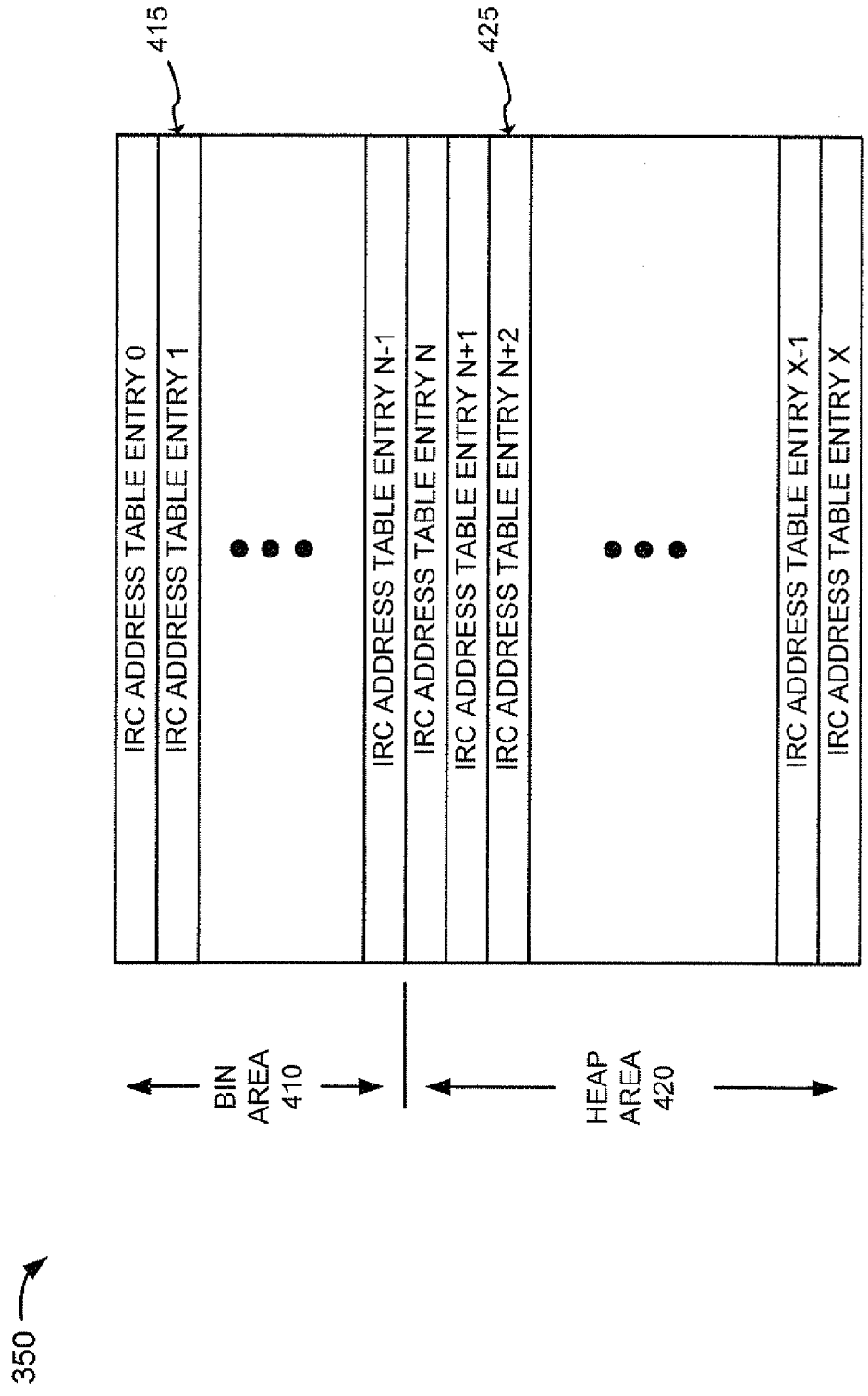
FIG. 4 is an exemplary diagram of the address table of FIG. 3.

FIG. 4 is an exemplary diagram of the address table 330. The address table 330 may be organized as an array of entries, such as 4096 entries, divided into a bin area 410 and a heap area 420. The entries in the bin area 410 are called bin entries 415 and the entries in the heap area 420 are called heap entries 425. The bin area 410 is the starting point for searches by the IRC 245 for a particular entry in the address table 330. The IRC 245 performs hash searches of the address table 330.

A bin entry 415 may be empty or non-empty. Each of the non-empty bin entries 415 is a first entry in a list of one or more entries. If the list of a bin entry 415 contains more than one entry, the second and subsequent entries are stored in the heap area 420. A pointer associated with the bin entry 415 identifies the location of the next entry in the chain. The additional entries in the list of the bin entry 415 may be linked together to form a linear list.

The host 160 (FIG. 1) may initialize the values in the address table 330. Upon power-up, the host 160 may load values into the bin entries 415 based on the network configuration, including the VLAN configurations. The heap entries 425 are not fixed at power-up and may be used for adding entries to the address table 330. The IRC 245 may use to the specific fields of the address table 330 to make frame forwarding decisions when data frames are received by the multiport switch 180.

Figure 5:
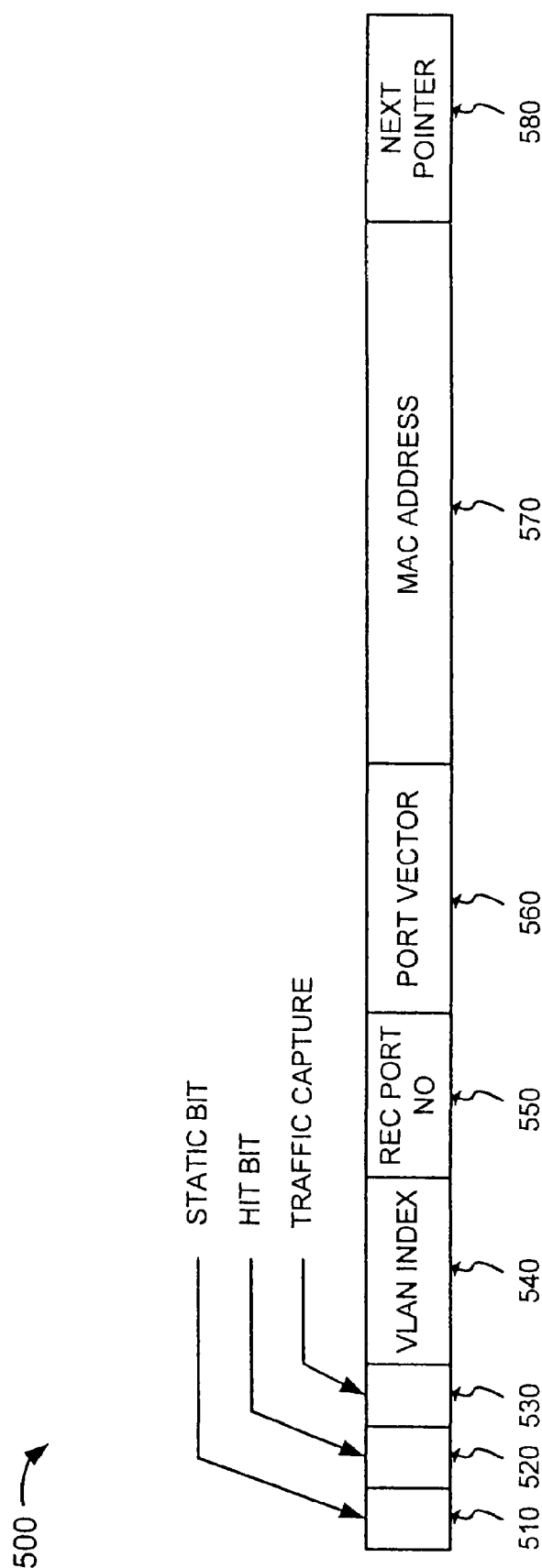
FIG. 5 is an exemplary diagram of an entry in the address table of FIG. 4.

FIG. 5 is an exemplary diagram of an entry 500 in the address table 330. The entry 500 may include a static bit field 510, a hit bit field 520, a traffic capture field 530, a VLAN index field 540, a receive port number field 550, a port vector field 560, a MAC address field 570, and a next pointer field 580. The static bit field 510 may store a bit that prevents the entry 500 from being deleted by an aging function that deletes entries corresponding to end nodes, such as network stations 110, that have not transmitted for longer than a predetermined period of time. The hit bit field 520 may store a bit used for the aging function. For example, the IRC 245 may update the bit in the hit bit field 520 when the source address in a received data frame matches the source address stored in the MAC address field 570 of the entry 500.

The traffic capture field 530 may store a bit that identifies traffic capture MAC source and destination addresses. The VLAN index field 540 may store data used to reference a 12-bit VLAN ID. The receive port number field 550 may store data that identifies the port on which the MAC address in the MAC address field 570 resides. The port vector field 560 may store data that identifies the ports to which the data frame should be forwarded. The MAC address field 570 may store a MAC source and/or destination address of a received frame. The MAC address may include a unicast, multicast, or broadcast address. The next pointer field 580 may store a pointer to the next entry in a chain of entries.

Exemplary Processing

The IRC 245 performs processing, consistent with the present invention, to minimize software accesses by the host 160 to the address table 330 and increase the operating speed of the multiport switch 180. According to the present invention, the IRC 245 performs certain processing in response to software commands from the host 160. For example, the commands may include instructions for adding or modifying an entry, deleting an entry, and searching for a MAC address.

Figure 6:
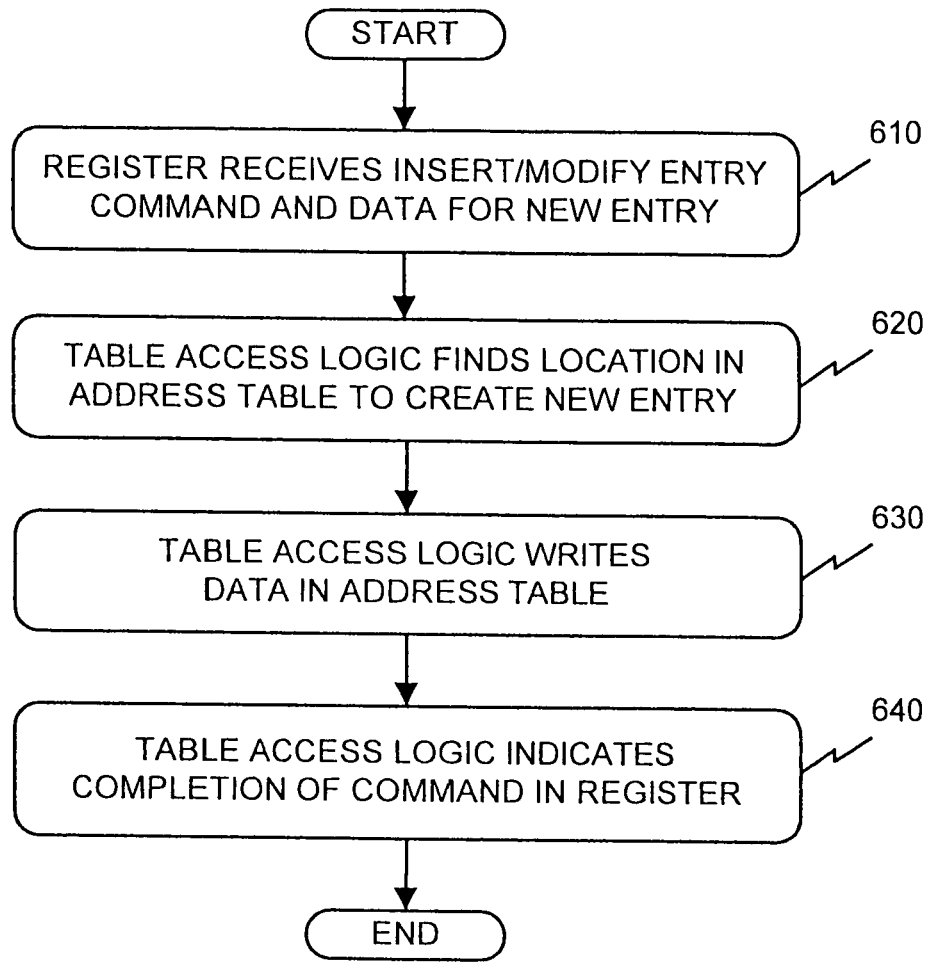
FIG. 6 is a flowchart of exemplary processing for inserting/modifying a table entry according to an implementation consistent with the present invention.

FIG. 6 is a flowchart of exemplary processing for inserting/modifying a table entry according to an implementation consistent with the present invention. Processing may begin with the host 160 writing an insert/modify entry command to the register 310 [act 610]. The host 160 may also write the data for the table entry to the register 310 and may, possibly, set a bit in the register 310 indicating that a valid command and/or data is/are stored in the register 310 [act 610]. The data may include some or all of the data of a typical address table 330 entry, such as entry 500 (FIG. 5). The host 160 may perform these writing operations via the host interface 260 and the host bus 262.

The table access logic 320 within the IRC 245 may read the command from the register 310 and find a location within the address table 330 to store the entry [act 620]. The table access logic 320 may subject the source and/or destination address and VLAN ID stored in the register 310 to a hashing function to locate the appropriate bin list in the address table 330 and determine whether the entry should be included in an already existing bin list. For an already existing bin list, the table access logic 320 may identify a location in the heap area 420 to create the entry and modify the pointer in the next pointer field 580 of the last entry in the bin list to point to the identified location.

The table access logic 320 may store the new data in the address table 330 at the identified location [act 630]. If the table access logic 320 determines that an entry with the same source or destination address and VLAN ID already exists, the table access logic 320 overwrites the existing entry with the new data. For a new bin list, the table access logic 320 may identify a location in the bin area 410 and create the new entry. This processing eliminates the need for the host 160 to insert/modify an entry in the address table 330, thereby minimizing congestion on the host bus 262 and increasing operating performance of the multiport switch 180.

When the table access logic 320 completes its functions for inserting or modifying an entry in the address table 330, the table access logic 320 may set or clear a bit in the register 310 [act 640]. The host 160 may periodically poll the register 310 to determine whether the command has been carried out.

Figure 7:
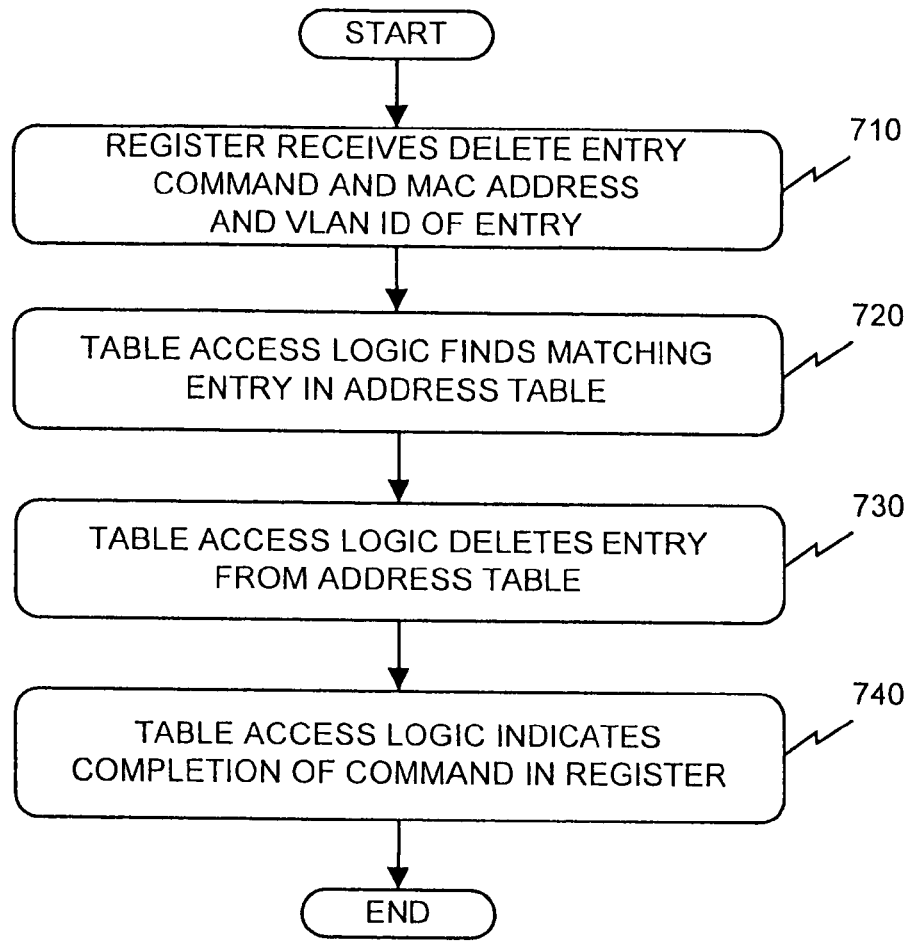
FIG. 7 is a flowchart of exemplary processing for deleting a table entry according to an implementation consistent with the present invention.

FIG. 7 is a flowchart of exemplary processing for deleting a table entry according to an implementation consistent with the present invention. Processing may begin with the host 160 writing a delete entry command to the register 310 [act 710]. The host 160 may also write data, such as the source and/or destination address and VLAN ID, of an entry to be deleted from the address table 330 to the register 310 and may, possibly, set a bit in the register 310 indicating that a valid command and/or data is/are stored in the register 310 [act 710]. The host 160 may perform these writing operations via the host interface 260 and host bus 262.

The table access logic 320 within the IRC 245 may read the command from the register 310 and find a matching entry within the address table 330 [act 720]. The table access logic 320 may subject the source and/or destination address and VLAN ID to a hashing function to locate the appropriate bin list in the address table 330. The table access logic 320 may then search the entries in the bin list using, for example, the source or destination address and VLAN ID in the register 310.

When a matching entry is found, the table access logic 320 deletes the entry [act 730]. The table access logic 320 may also copy the contents of the pointer field of the deleted entry to the pointer field of the entry that immediately precedes the deleted entry in the bin list. This processing eliminates the need for the host 160 to delete the entry from the address table 330, thereby minimizing congestion on the host bus 262 and increasing operating performance of the multiport switch 180.

When the table access logic 320 completes its functions for deleting an entry in the address table 330, the table access logic 320 may set or clear a bit in the register 310 [act 740]. The host 160 may periodically poll the register 310 to determine whether the command has been carried out.

Figure 8:
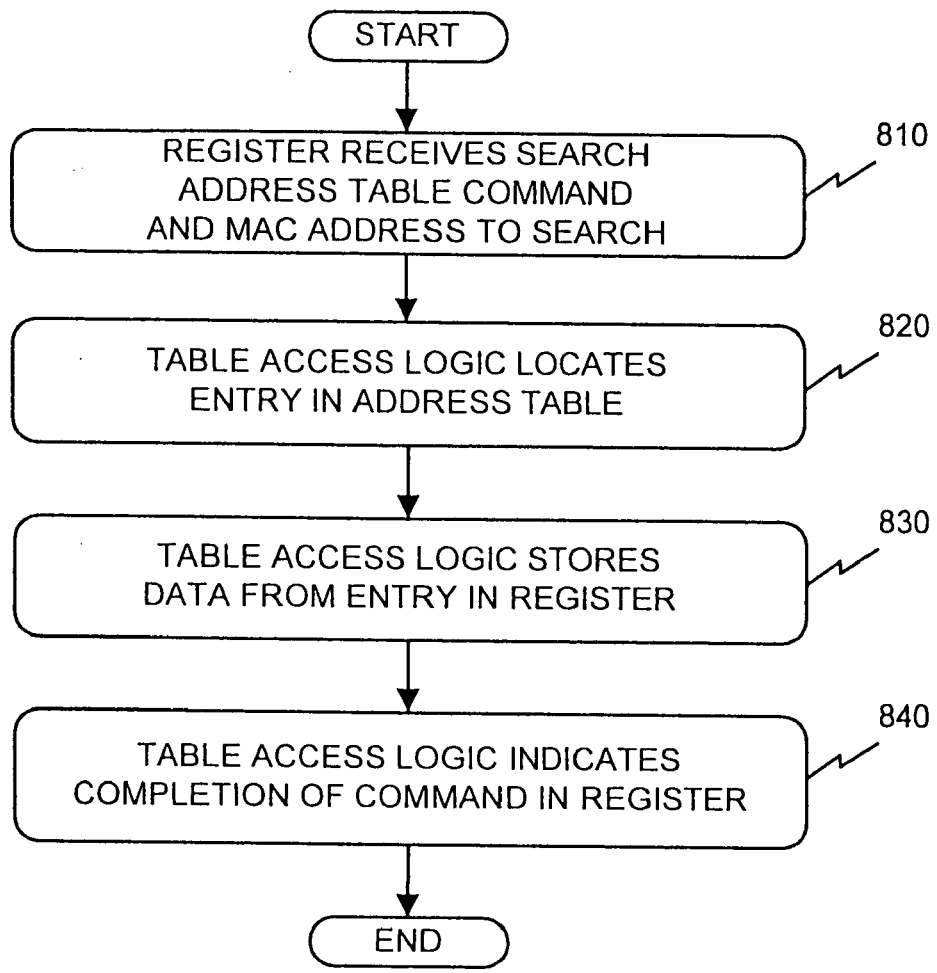
FIG. 8 is a flowchart of exemplary processing for searching the address table of FIG. 4 according to an implementation consistent with the present invention.

FIG. 8 is a flowchart of exemplary processing for searching the address table 330 for a MAC address according to an implementation consistent with the present invention. Processing may begin with the host 160 writing a search address table command to the register 310 [act 810]. The host 160 may also write data, such as the source and/or destination MAC address, of an entry to be located in the address table 330 to the register 310 and may, possibly, set a bit in the register 310 indicating that a valid command and/or data is/are stored in the register 310 [act 810]. The host 160 may perform these writing operations via the host interface 260 and host bus 262.

The table access logic 320 within the IRC 245 may read the command from the register 310 and find a matching entry within the address table 330 [act 820]. The table access logic 320 may search the address table 330 using the source and/or destination MAC address to locate the appropriate entry. When a matching entry is found, the table access logic 320 may read the entry and store its contents in the register 310 [act 830]. This processing eliminates the need for the host 160 to search the address table 330, thereby minimizing congestion on the host bus 262 and increasing operating performance of the multiport switch 180.

When the table access logic 320 completes its functions for searching the address table 330, the table access logic 320 may set or clear a bit in the register 310 [act 840]. The host 160 may periodically poll the register 310 to determine whether the command has been carried out and to access the search results.

Described has been a system and method for accessing an address table of a multiport switch 180. Advantages of the present invention include maximizing the efficiency and operating performance of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, the address table 330 has been described as being located within the IRC 245. In alternative implementations consistent with the present invention, the address table 330 may be located outside the IRC 245 within another part of the multiport switch 180 or external to the multiport switch 180.

Also, the register 310 has been described as a register within the IRC 245. In other implementations consistent with the present invention, the register 310 may be included within the registers 250. In this case, the IRC 245 may periodically poll the register 310 to determine whether there is anything it needs to do on behalf of the host 160.

Further, it has been described that the register 310 stores the commands from the host 160. In other implementations consistent with the present invention, the host 160 sends the commands directly to the table access logic 320 via the host bus 262.

What is claimed is:

1. A network device connected to a host located externally with respect to the network device, the network device comprising:
    a plurality of receive elements configured to receive data from network stations;
    a plurality of transmit elements configured to transmit data from the network device;
    an address table configured to store a plurality of entries;
    an address register accessible by the host and configured to store an address of one of the entries in the address table;
    an address table access port accessible by the host and configured to store contents of one of the entries in the address table; and
    table access logic configured to receive a command from the host to read one of the entries in the address table, locate the one entry in the address table in response to the command, store an address of the one entry in the address register for access by the host, and store contents of the one entry in the address table access port for access by the host.

2. The network device of claim 1, wherein the table access logic is configured to receive a command from the host to read a next one of the entries in the address table, locate the next entry in the address table, store an address of the next entry in the address register for access by the host, and store contents of the next entry in the address table access port for access by the host.

3. The network device of claim 2, wherein when locating the next entry, the table access logic is configured to read an address from the address register to identify a currently addressed one of the entries, read a pointer from the currently addressed entry, and locate the next entry using the pointer.

4. The network device of claim 1, wherein the table access logic is configured to receive a command from the host to read a first one of the entries in the address table, locate the first entry in the address table, store an address of the first entry in the address register for access by the host, and store contents of the first entry in the address table access port for access by the host.

5. The network device of claim 1, wherein the entries include bin entries and heap entries, at least one of the bin entries including a pointer to one of the heap entries, at least one of the heap entries including a pointer to another one of the heap entries.

6. The network device of claim 1, further comprising:
an input data holding register configured to store data corresponding to a new entry to be created in the address table or an existing one of the entries to be modified or deleted from the address table.

7. The network device of claim 6, wherein the table access logic is further configured to receive an insert table entry command from the host, find a location in the address table to create a new entry, and store the data from the input data holding register at the location in the address table.

8. The network device of claim 6, wherein the table access logic is further configured to receive a modify table entry command from the host, locate one of the entries in the address table to modify using the data from the input data holding register, and overwrite the located entry with the data from the input data holding register.

9. The network device of claim 8, wherein when locating one of the entries to modify, the table access logic is configured to read a source address and virtual local area network (VLAN) identifier from the input data holding register and find one of the entries in the address table with a matching source address and VLAN identifier.

10. The network device of claim 6, wherein the table access logic is further configured to receive a delete table entry command from the host, locate one of the entries in the address table to delete using the data from the input data holding register, and delete the located entry from the address table.

11. The network device of claim 10, wherein when locating one of the entries to delete, the table access logic is configured to read a source address and virtual local area network (VLAN) identifier from the input data holding register and find one of the entries in the address table with a matching source address and VLAN identifier.

12. A network device connected to a host located externally with respect to the network device, the network device comprising:
an address table configured to store a plurality of entries;
an input data holding register configured to store data received from the host, the data corresponding to a new entry to be created in the address table or an existing one of the entries to be modified or deleted from the address table; and
table access logic configured to receive at least one of a modify table entry command or a delete table entry command from the host, apply a hashing function to the data in the input data holding register, search the address table to locate one of the entries to modify or delete using the hashed data, overwrite the located entry with the data from the input data holding register when the command is the modify table entry command, and delete the located entry from the address table when the command is the delete table entry command.

13. The network device of claim 12, wherein when searching the address table, the table access logic is configured to read a source address and virtual local area network (VLAN) identifier from the input data holding register and find one of the entries in the address table with a matching source address and VLAN identifier.

14. The network device of claim 12, wherein the table access logic is further configured to receive an insert table entry command from the host, find a location in the address table to create a new entry, and store the data from the input data holding register at the location in the address table.

15. The network device of claim 12, further comprising:
an address register accessible by the host and configured to store an address of one of the entries in the address table; and
an address table access port accessible by the host and configured to store contents of one of the entries in the address table.

16. The network device of claim 15, wherein the table access logic is further configured to receive a command from the host to read one of the entries in the address table, locate the one entry in the address table in response to the command, store an address of the one entry in the address register for access by the host, and store contents of the one entry in the address table access port for access by the host.

17. The network device of claim 16, wherein the table access logic is configured to receive a command from the host to read a next one of the entries in the address table, locate a currently addressed one of the entries using the address from the address register, read a pointer from the currently addressed entry, locate the next entry using the pointer, store an address of the next entry in the address register for access by the host, and store contents of the next entry in the address table access port for access by the host.

18. The network device of claim 16, wherein the table access logic is configured to receive a command from the host to read a first one of the entries in the address table, locate the first entry in the address table, store an address of the first entry in the address register for access by the host, and store contents of the first entry in the address table access port for access by the host.

19. A network device connected to a host located externally with respect to the network device, the network device comprising:
an address table configured to store a plurality of entries;
an address register accessible by the host and configured to store an address of one of the entries in the address table;
an address table access port accessible by the host and configured to store contents of one of the entries in the address table;
an input data holding register configured to store data for a new entry to be created in the address table or an existing one of the entries to be modified or deleted from the address table; and
table access logic configured to receive a command from the host to read one of the entries in the address table, locate the one entry in the address table in response to the command, store an address of the one entry in the address register for access by the host, and store contents of the one entry in the address table access port for access by the host, the table access logic being further configured to receive at least one of a modify table entry command or a delete table entry command from the host, locate one of the entries in the address table to modify or delete using the data from the input data holding register, overwrite the located entry with the data from the input data holding register when the table access logic receives the modify table entry command, and delete the located entry from the address table when the table access logic receives the delete table entry command.

20. The network device of claim 19, wherein when locating one of the entries to modify or delete, the table access logic is configured to read a source address and virtual local area network (VLAN) identifier from the input data holding register and find one of the entries in the address table with a matching source address and VLAN identifier.

* * * * *

UNITED STATES PATENT AND TRADEMARK OFFICE
CERTIFICATE OF CORRECTION

| | |
|---|---|
| PATENT NO. | : 7,080,135 B1 |
| APPLICATION NO. | : 09/767884 |
| DATED | : July 18, 2006 |
| INVENTOR(S) | : Robert Williams |

It is certified that error appears in the above-identified patent and that said Letters Patent is hereby corrected as shown below:

The abstract is incorrect in its entirety and should be changed to the attached abstract.

The drawings (all 8 sheets) are incorrect and should be changed to the attached 9 sheets (Figs. 1-9.).

The specification, beginning at column 1, line 5 through column 10, line 18, is incorrect in its entirety and should be changed to the attached specification.

Signed and Sealed this
Seventh Day of February, 2012

David J. Kappos
*Director of the United States Patent and Trademark Office*

(12) United States Patent
Williams

(10) Patent No.: US 7,080,135 B1
(45) Date of Patent: *Jul. 18, 2006

(54) SYSTEMS AND METHODS FOR ACCESSING AN ADDRESS TABLE OF A NETWORK DEVICE

(75) Inventor: Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 09/767,884

(22) Filed: Jan. 24, 2001

(51) Int. Cl.
*G06F 15/173* (2006.01)

(52) U.S. Cl. .............. 709/223; 709/217; 709/245

(58) Field of Classification Search ............ 709/223, 709/225, 200, 245, 238, 220, 217; 395/325, 395/200.48; 714/758; 370/238, 241, 392; 711/209
See application file for complete search history.

(56) References Cited

U.S. PATENT DOCUMENTS

| | | | | |
|---|---|---|---|---|
| 3,972,025 | A | | 7/1976 | Taddei ............... 340/172.5 |
| 5,247,620 | A | * | 9/1993 | Fukuzawa et al. ......... 709/245 |
| 5,592,625 | A | | 1/1997 | Sandberg ............ 395/200.08 |
| 5,892,912 | A | | 4/1999 | Suzuki et al. ......... 395/200.48 |
| 5,960,169 | A | * | 9/1999 | Styczinski ............... 714/6 |
| 5,978,951 | A | * | 11/1999 | Lawler et al. ............ 714/758 |
| 6,108,308 | A | * | 8/2000 | Flavin et al. ............ 370/238 |
| 6,111,874 | A | | 8/2000 | Kerstein .................. 370/389 |
| 6,205,465 | B1 | * | 3/2001 | Schoening et al. ........ 718/102 |
| 6,470,436 | B1 | * | 10/2002 | Croft et al. ............... 711/206 |
| 6,505,228 | B1 | * | 1/2003 | Schoening et al. ......... 718/106 |
| 6,604,136 | B1 | | 8/2003 | Chang et al. .............. 709/223 |
| 6,654,347 | B1 | | 11/2003 | Wiedeman et al. ......... 370/241 |
| 6,681,258 | B1 | | 1/2004 | Ratcliff et al. ........... 709/245 |
| 2003/0172147 | A1 | * | 9/2003 | Chang et al. ............. 709/223 |

OTHER PUBLICATIONS

U.S. Appl. No. 09/814,818, filed Mar. 23, 2001.

* cited by examiner

*Primary Examiner* — Frantz B. Jean
(74) *Attorney, Agent, or Firm* — Harrity Snyder, LLP

(57) ABSTRACT

A multiport network device, connected to a host, includes an address table, address register, address table access port, input data holding register, and table access logic. The address table stores multiple entries. The address register is accessible by the host and stores an address of an entry in the address table. The address table access port is also accessible by the host and stores the contents of an entry in the address table. The input data holding register stores data for a new entry to be created in the address table or an existing entry to be modified or deleted from the address table. The table access logic receives a command from the host to read one of the entries in the address table, locates the entry in the address table in response to the command, stores an address of the entry in the address register for access by the host, and stores the contents of the one entry in the address table access port for access by the host. The table access logic also receives a modify or delete table entry command from the host and locates the entry in the address table to modify or delete using the data from the input data holding register. The table access logic overwrites the entry with the data from the input data holding register when the received command is the modify table entry command and deletes the entry from the address table when the command is the delete table entry command.

20 Claims, 9 Drawing Sheets

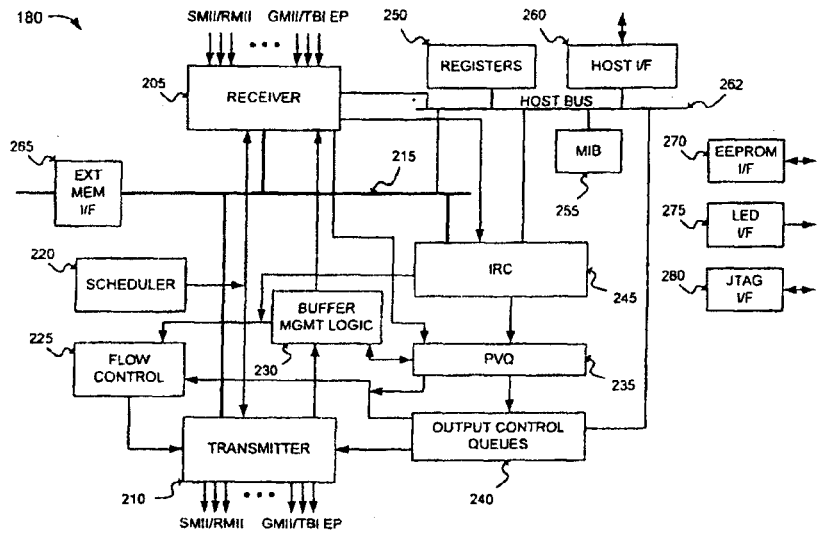

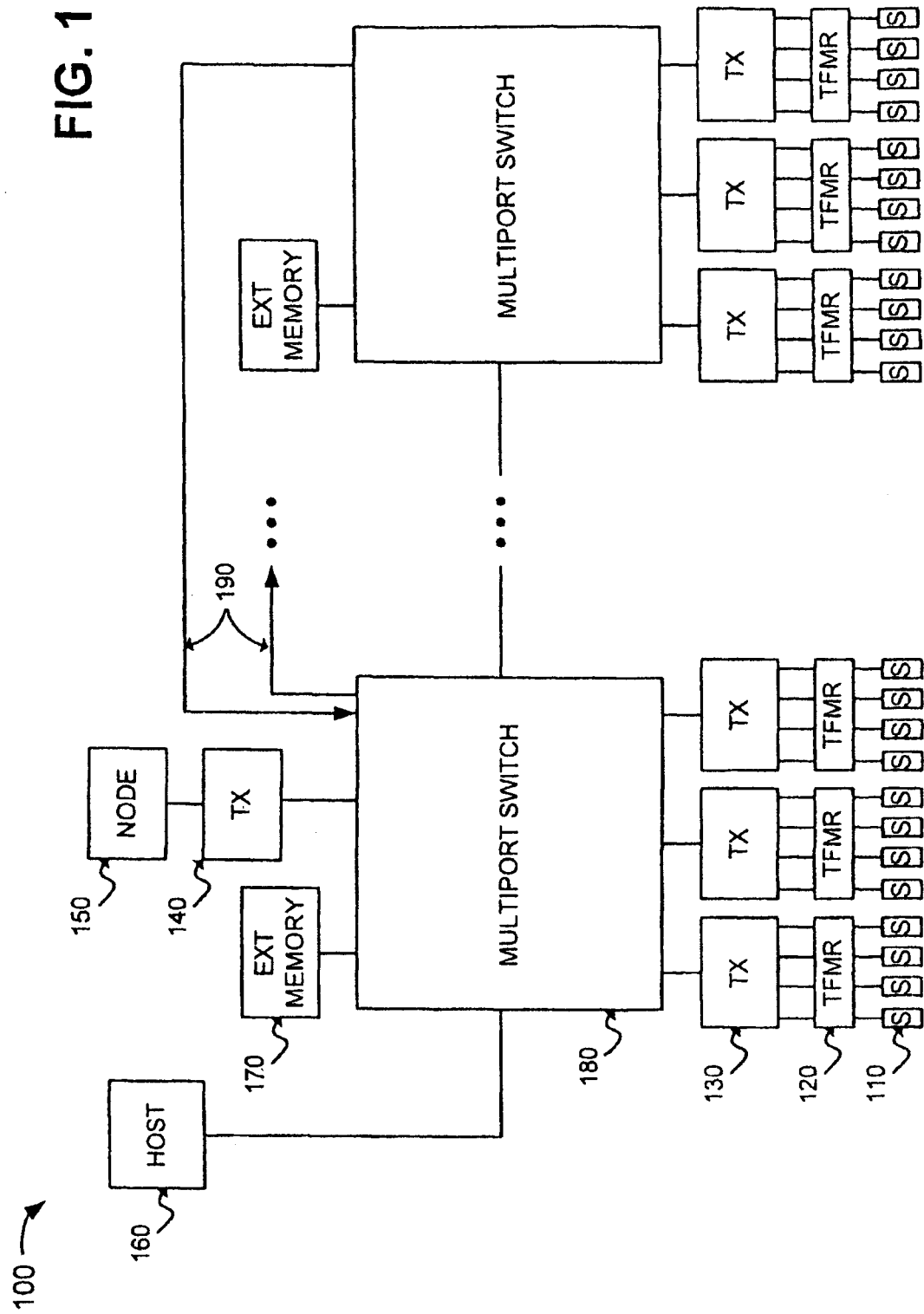

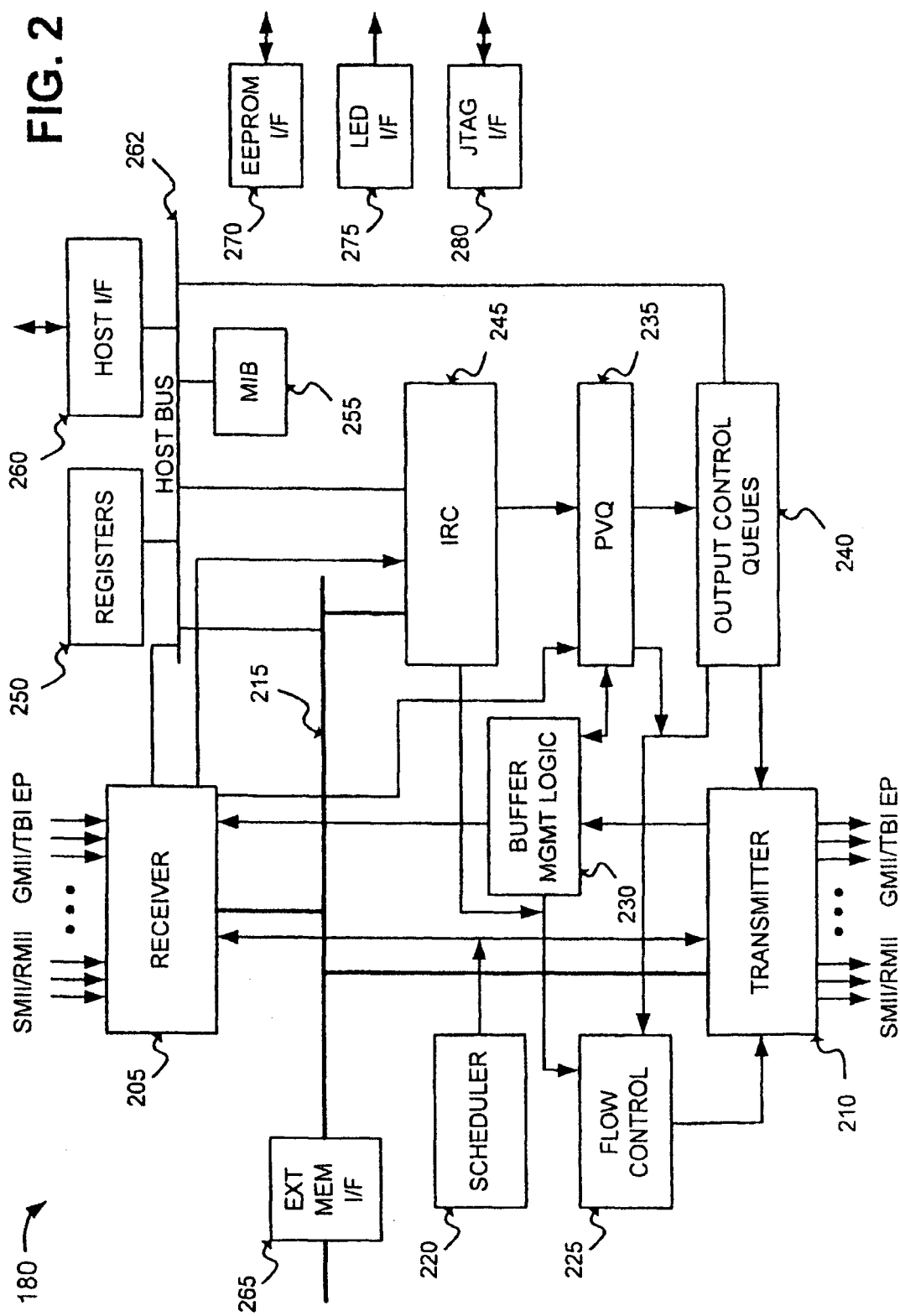

SYSTEMS AND METHODS FOR ACCESSING AN ADDRESS TABLE OF A NETWORK DEVICE

TECHNICAL FIELD

The present invention relates generally to communication systems and, more particularly, to systems and methods for accessing an address table of a network device.

BACKGROUND ART

Conventional network switches typically include an address table that aids the switch in making forwarding decisions regarding a received packet. Sometimes the address table can be modified both by hardware and software. During the course of normal operation, the hardware creates new entries to the table as it learns new source address information. The hardware also deletes entries when certain end nodes have not transmitted any data for a predetermined amount of time.

Management software also creates and deletes table entries, as well as periodically searches the table. There are instances, however, where the software needs to access the table to: (1) add and delete multicast entries as multicast sessions are established; (2) control all of the table modifications for security purposes; and (3) delete all entries in the table learned on a specific port in certain situations and delete all entries in the table except those entries learned on a specific port in other situations.

Problems arise, however, as a result of the software accesses to the table. For example, each of the software accesses typically uses scarce bus bandwidth. Also, while the software modifies the table, the software must lock relevant portions of the table so that the hardware does not access invalid data while the data is being changed.

DISCLOSURE OF THE INVENTION

There exists a need for mechanisms to perform accesses to an address table of a multiport switch that minimize accesses to the table by management software. This and other needs are met by the present invention, where local hardware, under software control when needed, performs searches of and modifications to the address table.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device, connected to a host, that includes an address table, address register, address table access port, input data holding register, and table access logic. The address table stores multiple entries. The address register is accessible by the host and stores an address of an entry in the address table. The address table access port is also accessible by the host and stores the contents of an entry in the address table. The input data holding register stores data for a new entry to be created in the address table or an existing entry to be modified or deleted from the address table.

The table access logic receives a command from the host to read one of the entries in the address table, locates the entry in the address table in response to the command, stores an address of the entry in the address register for access by the host, and stores the contents of the one entry in the address table access port for access by the host. The table access logic also receives a modify or delete table entry command from the host and locates the entry in the address table to modify or delete using the data from the input data holding register. The table access logic overwrites the entry with the data from the input data holding register when the received command is the modify table entry command and deletes the entry from the address table when the command is the delete table entry command.

In another implementation consistent with the present invention, a network device connects to a host and includes an address table, an address register, an address table access port, and table access logic. The address table stores multiple entries. The address register is accessible by the host and stores an address of one of the entries in the address table. The address table access port is also accessible by the host and stores the contents of one of the entries in the address table. The table access logic receives a command from the host to read one of the entries in the address table, locates the entry in the address table in response to the command, stores an address of the entry in the address register for access by the host, and stores the contents of the entry in the address table access port for access by the host.

In a further implementation consistent with the present invention, a network device connects to a host and includes an address table, an input data holding register, and table access logic. The address table stores multiple entries. The input data holding register stores data corresponding to a new entry to be created in the address table or an existing one of the entries to be modified or deleted from the address table. The table access logic receives a modify table entry command or a delete table entry command from the host, applies a hashing function to the data in the input data holding register, and searches the address table to locate one of the entries to modify or delete using the hashed data. The table access logic overwrites the located entry with the data from the input data holding register when the command is the modify table entry command and deletes the located entry from the address table when the command is the delete table entry command.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

Figure 9:
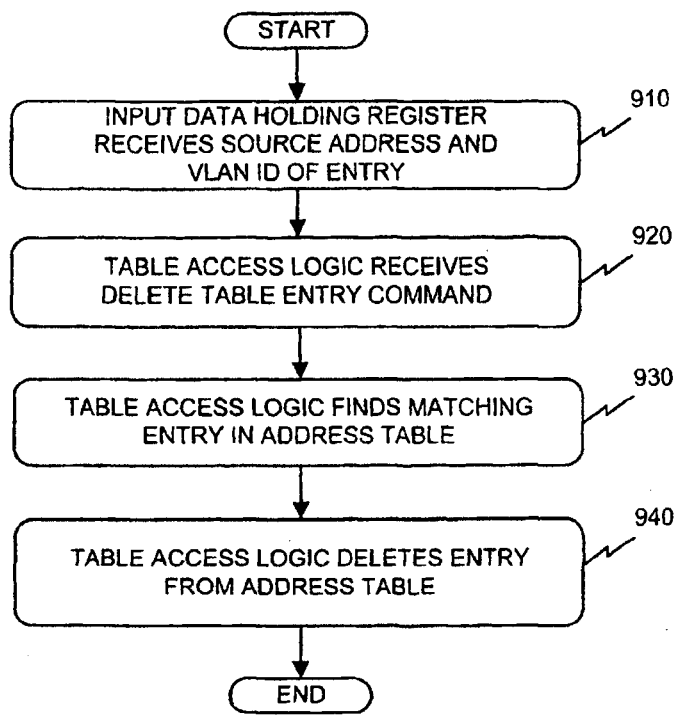

FIG. 1 is a block diagram of an exemplary system in which systems and methods consistent with the present invention may be implemented;

FIG. 2 is a detailed diagram of a multiport switch of FIG. 1 according to an implementation consistent with the present invention;

FIG. 3 is an exemplary diagram of a portion of the internal rules checker of FIG. 2 according to an implementation consistent with the present invention;

FIG. 4 is an exemplary diagram of the address table of FIG. 3;

FIG. 5 is an exemplary diagram of an entry in the address table of FIG. 4;

FIG. 6 is a flowchart of exemplary processing for reading a first table entry according to an implementation consistent with the present invention;

FIG. 7 is a flowchart of exemplary processing for reading a next table entry according to an implementation consistent with the present invention;

FIG. 8 is a flowchart of exemplary processing for inserting/modifying a table entry according to an implementation consistent with the present invention; and FIG. 9 is a flowchart of exemplary processing for deleting a table entry according to an implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

SWITCH ARCHITECTURE OVERVIEW

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table. The IRC address table is described in more detail below with regard to FIG. 4.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

EXEMPLARY INTERNAL RULES CHECKER

The present invention is directed to the IRC 245 and, more particularly, to hardware logic within the IRC 245 that operates under software control to access the address table of the IRC 245 in a manner that efficiently uses the scarce bandwidth on the host bus 262 and increases the operating speed of the multiport switch 180.

FIG. 3 is an exemplary diagram of a portion of the IRC 245 in accordance with an implementation consistent with the present invention. The IRC 245 may include an address table access port 310, an address register 320, an input data holding register 330, table access logic 340, and an IRC address table 350. The address table access port 310 may provide access to the address table 350 to the host 160 and may include a register that stores data corresponding to an entry in the address table 350. The address register 320 may include a register that stores the address of an entry in the address table 350. The input data holding register 330 may include a register that stores data for a new table entry to be created or an existing table entry to be deleted. The table access logic 340 may include one or more hardware components, such as a controller and/or a number of logic gates, capable of executing commands for accessing the address table 350.

The address table 350 may support user addresses and capabilities for unique VLANs. The number of addresses and VLANs supported may differ depending on the desired table size. VLANs provide broadcast domains, where the broadcast traffic is kept inside of the VLAN. For example, a specific VLAN may contain a group of users at a high level of an organization. When sending data to this group of users, the data may include a specific VLAN identifier (ID) associated with this particular group to ensure that only these users receive the data. These VLAN groupings can be considered "sub-networks" within a larger network.

FIG. 4 is an exemplary diagram of the address table 350. The address table 350 may be organized as an array of entries, such as 4096 entries, divided into a bin area 410 and a heap area 420. The entries in the bin area 410 are called bin entries 415 and the entries in the heap area 420 are called heap entries 425. The bin area 410 is the starting point for searches by the IRC 245 for a particular entry in the address table 350. The IRC 245 performs hash searches of the address table 350.

A bin entry 415 may be empty or non-empty. Each of the non-empty bin entries 415 is a first entry in a list of one or more entries. If the list of a bin entry 415 contains more than one entry, the second and subsequent entries are stored in the heap area 420. A pointer associated with the bin entry 415 identifies the location of the next entry in the chain. The additional entries in the list of the bin entry 415 may be linked together to form a linear list.

The host 160 (FIG. 1) may initialize the values in the address table 350. Upon power-up, the host 160 may load values into the bin entries 415 based on the network configuration, including the VLAN configurations. The heap entries 425 are not fixed at power-up and may be used for adding entries to the address table 350. The IRC 245 may use the specific fields of the address table 350 to make frame forwarding decisions when data frames are received by the multiport switch 180.

FIG. 5 is an exemplary diagram of an entry 500 in the address table 350. The entry 500 may include a static bit field 510, a hit bit field 520, a traffic capture field 530, a VLAN index field 540, a receive port number field 550, a port vector field 560, a MAC address field 570, and a next pointer field 580. The static bit field 510 may store a bit that prevents the entry 500 from being deleted by an aging function that deletes entries corresponding to end nodes, such as network stations 110, that have not transmitted for longer than a predetermined period of time. The hit bit field 520 may store a bit used for the aging function. For example, the IRC 245 may update the bit in the hit bit field 520 when the source address in a received data frame matches the source address stored in the MAC address field 570 of the entry 500.

The traffic capture field 530 may store a bit that identifies traffic capture MAC source and destination addresses. The VLAN index field 540 may store data used to reference a 12-bit VLAN ID. The receive port number field 550 may store data that identifies the port on which the MAC address in the MAC address field 570 resides. The port vector field 560 may store data that identifies the ports to which the data frame should be forwarded. The MAC address field 570 may store a MAC source and/or destination address of a received frame. The MAC address may include a unicast, multicast, or broadcast address. The next pointer field 580 may store a pointer to the next entry in a chain of entries.

EXEMPLARY PROCESSING

The IRC 245 performs processing, consistent with the present invention, to minimize software accesses by the host 160 to the address table 350 and increase the operating speed of the multiport switch 180. According to the present invention, the IRC 245 performs certain processing in response to software commands from the host 160. For example, the commands may include instructions for reading the first table entry, reading the next table entry, inserting/modifying a table entry, and deleting a table entry.

FIG. 6 is a flowchart of exemplary processing for reading a first table entry according to an implementation consistent with the present invention. The host 160 issues a Read First Table Entry command to the multiport switch 180. The table access logic 340 within the IRC 245 receives the command [step 610] and locates the first entry in the address table 350 [step 620]. The table access logic 340 may search the table 350 to locate the first bin entry 415 in the bin area 410. Once the table access logic 340 locates the first entry, the table access logic 340 stores the address of the first entry in the address register 320 [step 630].

The table access logic 340 may then read the contents of the entry and store the contents within the address table access port 310 [step 640]. The address and contents of the first entry may then be available at any time to the host 160. The host 160 may access the address and contents of the first entry by simply reading the address register 320 and the address table access port 310, respectively. This processing eliminates the need for the host 160 to search for and locate the first entry in the address table 350, thereby minimizing congestion on the host bus 262 and increasing operating performance of the multiport switch 180.

FIG. 7 is a flowchart of exemplary processing for reading a next table entry according to an implementation consistent with the present invention. The host 160 issues a Read Next Table Entry command to the multiport switch 180. The table access logic 340 within the IRC 245 receives the command [step 710] and locates the next entry in the table search order [step 720]. The table access logic 340 may read the address from the address register 320 to locate the currently addressed entry. The table access logic 340 may then store the pointer from the next pointer field 580 in the address register 320 [step 730]. The pointer identifies the next entry in a bin list. If the next pointer field 580 indicates the end of a bin list, the table access logic 340 may store the address of the first entry in the next bin list in the address register 320. If the next bin entry 415 is empty, the table access logic 340 may examine entries in the bin area 410 until it finds a non-empty bin entry 415.

The table access logic 340 may then access this next entry to read the contents of the entry and store the contents of the entry in the register within the address table access port 310 [step 740]. The address and contents of the next entry may then be available at any time to the host 160. The host 160 may access the address and contents of the next entry by simply reading the address register 320 and the address table access port 310, respectively. This processing eliminates the need for the host 160 to search for and locate the next entry in the table search order, thereby minimizing congestion on the host bus 262 and increasing operating performance of the multiport switch 180.

FIG. 8 is a flowchart of exemplary processing for inserting/modifying a table entry according to an implementation consistent with the present invention. The host 160 writes data for a new table entry into the input data holding register 330 [step 810]. The host 160 may then issue an Insert/Modify Table Entry command to the multiport switch 180. The table access logic 340 within the IRC 245 receives the command [step 820] and finds a location within the address table 350 to create the new entry [step 830].

The table access logic 340 may subject the source and/or destination address and VLAN ID stored in the input data holding register 330 to a hashing function to locate the appropriate bin list in the address table 350 and determine whether the new entry should be included in an already existing bin list. For an already existing bin list, the table access logic 340 may identify a location in the heap area 420 to create the new entry and modify the pointer in the next pointer field 580 of the last entry in the bin list to point to the identified location. The table access logic 340 may store the new data in the address table 350 at the identified location [step 840]. If the table access logic 340 determines that an entry with the same source or destination address and VLAN ID already exists, the table access logic 340 overwrites the existing entry with the new data. For a new bin list, the table access logic 340 may identify a location in the bin area 410 and create the new entry. This processing eliminates the need for the host 160 to insert/modify an entry in the address table 350, thereby minimizing congestion on the host bus 262 and increasing operating performance of the multiport switch 180.

FIG. 9 is a flowchart of exemplary processing for deleting a table entry according to an implementation consistent with the present invention. The host 160 writes the source and/or destination address and VLAN ID of an entry to be deleted from the address table 350 into the input data holding register 330 [step 910]. The host 160 may then issue a Delete Table Entry command to the multiport switch 180. The table access logic 340 within the IRC 245 receives the command [step 920] and finds a matching entry within the address table 350 [step 930]. The table access logic 340 may subject the source and/or destination address and VLAN ID to a hashing function to locate the appropriate bin list in the address table 350. The table access logic 340 may then search the entries in the bin list using, for example, the source or destination address and VLAN ID in the input data holding register 330. When the matching entry is found, the table access logic 340 deletes the entry [step 940]. The table access logic 340 may also copy the contents of the pointer field of the deleted entry to the pointer field of the entry that immediately precedes the deleted entry in the bin list. This processing eliminates the need for the host 160 to delete the entry from the address table 350, thereby minimizing congestion on the host bus 262 and increasing operating performance of the multiport switch 180.

Described has been a system and method for modifying an address table of a multiport switch. Advantages of the present invention include maximizing the efficiency and operating performance of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, the address table 350 has been described as being located within the IRC 245. In alternative implementations consistent with the present invention, the address table 350 may be located outside the IRC 245 within another part of the multiport switch 180 or external to the multiport switch 180.

What is claimed is:

1. A network device connected to a host located externally with respect to the network device, the network device comprising:
    a plurality of receive elements configured to receive data from network stations;
    a plurality of transmit elements configured to transmit data from the network device;
    an address table configured to store a plurality of entries;
    an address register accessible by the host and configured to store an address of one of the entries in the address table;
    an address table access port accessible by the host and configured to store contents of one of the entries in the address table; and
    table access logic configured to receive a command from the host to read one of the entries in the address table, locate the one entry in the address table in response to the command, store an address of the one entry in the address register for access by the host, and store contents of the one entry in the address table access port for access by the host.

2. The network device of claim 1, wherein the table access logic is configured to receive a command from the host to read a next one of the entries in the address table, locate the next entry in the address table, store an address of the next entry in the address register for access by the host, and store contents of the next entry in the address table access port for access by the host.

3. The network device of claim 2, wherein when locating the next entry, the table access logic is configured to read an address from the address register to identify a currently addressed one of the entries, read a pointer from the currently addressed entry, and locate the next entry using the pointer.

4. The network device of claim 1, wherein the table access logic is configured to receive a command from the host to read a first one of the entries in the address table, locate the first entry in the address table, store an address of the first entry in the address register for access by the host, and store contents of the first entry in the address table access port for access by the host.

5. The network device of claim 1, wherein the entries include bin entries and heap entries, at least one of the bin entries including a pointer to one of the heap entries, at least one of the heap entries including a pointer to another one of the heap entries.

6. The network device of claim 1, further comprising:
an input data holding register configured to store data corresponding to a new entry to be created in the address table or an existing one of the entries to be modified or deleted from the address table.

7. The network device of claim 6, wherein the table access logic is further configured to receive an insert table entry command from the host, find a location in the address table to create a new entry, and store the data from the input data holding register at the location in the address table.

8. The network device of claim 6, wherein the table access logic is further configured to receive a modify table entry command from the host, locate one of the entries in the address table to modify using the data from the input data holding register, and overwrite the located entry with the data from the input data holding register.

9. The network device of claim 8, wherein when locating one of the entries to modify, the table access logic is configured to read a source address and virtual local area network (VLAN) identifier from the input data holding register and find one of the entries in the address table with a matching source address and VLAN identifier.

10. The network device of claim 6, wherein the table access logic is further configured to receive a delete table entry command from the host, locate one of the entries in the address table to delete using the data from the input data holding register, and delete the located entry from the address table.

11. The network device of claim 10, wherein when locating one of the entries to delete, the table access logic is configured to read a source address and virtual local area network (VLAN) identifier from the input data holding register and find one of the entries in the address table with a matching source address and VLAN identifier.

12. A network device connected to a host located externally with respect to the network device, the network device comprising:
an address table configured to store a plurality of entries;
an input data holding register configured to store data received from the host, the data corresponding to a new entry to be created in the address table or an existing one of the entries to be modified or deleted from the address table; and
table access logic configured to receive at least one of a modify table entry command or a delete table entry command from the host, apply a hashing function to the data in the input data holding register, search the address table to locate one of the entries to modify or delete using the hashed data, overwrite the located entry with the data from the input data holding register when the command is the modify table entry command, and delete the located entry from the address table when the command is the delete table entry command.

13. The network device of claim 12, wherein when searching the address table, the table access logic is configured to read a source address and virtual local area network (VLAN) identifier from the input data holding register and find one of the entries in the address table with a matching source address and VLAN identifier.

14. The network device of claim 12, wherein the table access logic is further configured to receive an insert table entry command from the host, find a location in the address table to create a new entry, and store the data from the input data holding register at the location in the address table.

15. The network device of claim 12, further comprising:
an address register accessible by the host and configured to store an address of one of the entries in the address table; and
an address table access port accessible by the host and configured to store contents of one of the entries in the address table.

16. The network device of claim 15, wherein the table access logic is further configured to receive a command from the host to read one of the entries in the address table, locate the one entry in the address table in response to the command, store an address of the one entry in the address register for access by the host, and store contents of the one entry in the address table access port for access by the host.

17. The network device of claim 16, wherein the table access logic is configured to receive a command from the host to read a next one of the entries in the address table, locate a currently addressed one of the entries using the address from the address register, read a pointer from the currently addressed entry, locate the next entry using the pointer, store an address of the next entry in the address register for access by the host, and store contents of the next entry in the address table access port for access by the host.

18. The network device of claim 16, wherein the table access logic is configured to receive a command from the host to read a first one of the entries in the address table, locate the first entry in the address table, store an address of the first entry in the address register for access by the host, and store contents of the first entry in the address table access port for access by the host.

19. A network device connected to a host located externally with respect to the network device, the network device comprising:
an address table configured to store a plurality of entries;
an address register accessible by the host and configured to store an address of one of the entries in the address table;
an address table access port accessible by the host and configured to store contents of one of the entries in the address table;
an input data holding register configured to store data for a new entry to be created in the address table or an existing one of the entries to be modified or deleted from the address table; and
table access logic configured to receive a command from the host to read one of the entries in the address table, locate the one entry in the address table in response to the command, store an address of the one entry in the address register for access by the host, and store contents of the one entry in the address table access port for access by the host, the table access logic being further configured to receive at least one of a modify table entry command or a delete table entry command from the host, locate one of the entries in the address table to modify or delete using the data from the input data holding register, overwrite the located entry with the data from the input data holding register when the table access logic receives the modify table entry command, and delete the located entry from the address table when the table access logic receives the delete table entry command.

20. The network device of claim 19, wherein when locating one of the entries to modify or delete, the table access logic is configured to read a source address and virtual local area network (VLAN) identifier from the input data holding register and find one of the entries in the address table with a matching source address and VLAN identifier.

* * * * *